United States Patent
Kim et al.

(10) Patent No.: US 7,492,969 B2
(45) Date of Patent: Feb. 17, 2009

(54) METHOD FOR MAGNIFYING IMAGE BY INTERPOLATION BASED ON EDGE AND CORNER

(75) Inventors: Hong-Seok Kim, Seoul (KR); Chang-Joon Park, Daejon (KR); Sung-Eun Kim, Daejon (KR); In-Ho Lee, Daejon (KR); Hyun-Bin Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 600 days.

(21) Appl. No.: 11/305,644

(22) Filed: Dec. 15, 2005

(65) Prior Publication Data

US 2006/0133698 A1    Jun. 22, 2006

(30) Foreign Application Priority Data

Dec. 20, 2004    (KR) ................... 10-2004-0108839

(51) Int. Cl.
G06K 9/32    (2006.01)
G06K 9/40    (2006.01)
(52) U.S. Cl. .................... 382/300; 382/266
(58) Field of Classification Search ............ 382/162, 382/167, 298–300, 260–266, 199, 278, 279, 382/210, 276; 358/1.1, 525, 515, 506, 530; 708/300, 304
See application file for complete search history.

(56) References Cited

U.S. PATENT DOCUMENTS

| | | | | |
|---|---|---|---|---|
| 5,131,057 A | * | 7/1992 | Walowit et al. | 382/264 |
| 6,392,765 B1 | * | 5/2002 | Sakaida | 358/525 |
| 6,570,673 B2 | * | 5/2003 | Kishimoto | 358/1.2 |
| 6,714,688 B1 | * | 3/2004 | Gallagher et al. | 382/266 |
| 6,771,835 B2 | * | 8/2004 | Han et al. | 382/260 |
| 6,810,156 B1 | * | 10/2004 | Itoh | 382/300 |

(Continued)

FOREIGN PATENT DOCUMENTS

JP    2003-008884    1/2003

(Continued)

OTHER PUBLICATIONS

Ron Kimmel, "Demosaicing: Image Reconstruction from Color CCD Samples," IEEE Transactions on Image□□Processing, 8(9), pp. 1221-1228, 1999.*

(Continued)

*Primary Examiner*—Jingge Wu
*Assistant Examiner*—Andrae S Allison
(74) *Attorney, Agent, or Firm*—Blakely, Sokoloff, Taylor & Zafman

(57) ABSTRACT

Provided is a method for magnifying an image by interpolation. The method including: a) setting m×m local windows and calculating a direction of each m×m local window; b) when a linear direction exists in an m×m local window, considering an edge exists; c) when a linear direction does not exist in the m×m local window, dividing the m×m local window into m/2×m/2 sub windows and calculating directions of the m/2×m/2 sub windows; d) when the directions of the m/2×m/2 sub windows exists toward the center of the m×m local window, considering a corner exists in the m×m local window; and e) selecting pixels located in a virtual line that goes along in the linear direction or in the directions to calculate a new pixel value by using the pixels.

5 Claims, 6 Drawing Sheets

U.S. PATENT DOCUMENTS

| | | | | |
|---|---|---|---|---|
| 6,987,893 B2 * | 1/2006 | Kim | ............................ | 382/300 |
| 6,999,099 B2 * | 2/2006 | Xavier | ......................... | 345/606 |
| 7,142,239 B2 * | 11/2006 | Cho | ............................ | 348/273 |
| 7,379,625 B2 * | 5/2008 | Wang et al. | .................. | 382/300 |
| 2006/0176315 A1 * | 8/2006 | Sellers | ........................ | 345/606 |

FOREIGN PATENT DOCUMENTS

| | | |
|---|---|---|
| KR | 1020020004246 A | 1/2002 |

OTHER PUBLICATIONS

Xin Li and Michael T. Orchard, "New Edge Directed Interpolation," IEEE Transactions on Image Processing, vol. 10, No. 10, Oct. 2001.*

Jia-Guu Leu, Sharpness preserving image enlargement based on a ramp edge model, Pattern Recognitionvol. 34, Issue 10, Oct. 2001, pp. 1927-1938.*

Xin Li, et al., "New Edge-Directed Interpolation", IEEE Trans on Image Processing, vol. 10, No. 10, Oct. 2001 (pp. 1521-1527).

* cited by examiner

METHOD FOR MAGNIFYING IMAGE BY INTERPOLATION BASED ON EDGE AND CORNER

FIELD OF THE INVENTION

The present invention relates to a method for magnifying an image data; and, more particularly, to a method for decreasing an image quality degradation caused by an edge fadeout and an aliasing when a digital image is arbitrarily magnified by an image processor such as a digital camera, a duplicator, a scanner, a printer, and a digital image displayer.

DESCRIPTION OF RELATED ARTS

In case of an analog image, it is possible to magnify the analog image by controlling a distance between a light source and the film with reducing an image quality degradation. On the other hand, when a digital image with a fixed resolution is enlarged, a degradation of an image quality can not be avoided due to a change of resolutions.

That is, when the digital image is enlarged, a value of a new pixel added around original pixels is interpolated and estimated with values of neighboring original pixels. Particularly, in case of using a low-quality interpolating method, a boundary can be blurred or a smooth border can be indented when the original digital image is magnified.

Generally, people are well aware of above distortions such as a blurred boundary or an indented border. Thus, edges and borders of symbols or objects displayed in analog/digital image are used as a major factor of determining an image quality.

A lot of algorithms and technologies are developed for decreasing image quality degradation such as an edge fadeout and an aliasing phenomenon when the digital image is enlarged. Representative technologies among the conventional method are a bi-linear algorithm and a bi-cubic algorithm. Recently, edge directed algorithms are newly suggested.

In the bi-linear algorithm, a value of a new pixel added around original pixels is calculated by using linear interpolation. Herein, 4 neighbor pixels (2×2) are used for calculating the value of the new pixel. However, there is a problem that the edge is blurred.

In addition, in the bi-cubic algorithm, a value of a new pixel added around original pixels is calculated by using 3-dimensional cubic spline. Herein, 16 neighbor pixels (4×4) are used for calculating the value of the new pixel. The edges generated by using the bi-cubic algorithm are clear than those generated by using the bi-linear algorithm. However, an image is totally rough due to the aliasing phenomenon on the edge.

Further, in the edge directed algorithms, an interpolation is performed by selecting neighbor pixels considering an edge. Thus, the edge is clear; and the aliasing phenomenon is decreased. However, if unsuitable neighbor pixels are selected for the interpolation, there is a problem that distorted result is produced in case of general image.

A method for keeping sharpness of text and graphic images is disclosed in Korea Patent No. 0335502 issued to Han, dated on Apr. 23, 2002, entitled "2-dimensional nonlinear interpolation system using edge information and method therefor".

In Han, sharpnesses of text and graphic images can be maintained without any distortion of edge and aliasing phenomena when the image is enlarged. However, Han is only responsible for an added text and graphic object on TV screen but cannot support an image size change, e.g., image resolution change, in a digital camera, a copier, a scanner, a printer, a digital image displayer, a document copywriter, and graphic software.

In addition, an edge directed interpolation method proposed in article by Xin Li & Michael T. Orchard, entitled "New Edge-Directed Interpolation," *IEEE Trans on Image Processing*, Vol. 10, pp 1521-1527, published dated October 2001. However, in the article by Xin Li, a distorted result and an extremely sharpness edge may be produced. When a high resolution digital image, e.g., photo, is inputted, a result such as an oil painting caused by jamming pixels having similar values may be produced. Thus, there are limitations such as long process time, low stability and low robustness.

SUMMARY OF THE INVENTION

It is, therefore, an object of the present invention to provide a method for magnifying image by an interpolation based on an edge and a corner that decreases image quality degradation caused by an edge fadeout and an aliasing when a digital image is arbitrary magnified by an image processor such as a digital camera, a duplicator, a scanner, a printer, and a digital image displayer.

In accordance with an aspect of the present invention, there is provided a method for magnifying image by an interpolation based on an edge and a corner, the method including the steps of: a) setting m×m local windows excluding outer boundaries of an original image, when the original image inputted for image enlargement by arbitrary magnification, and calculating a direction of each m×m local window; b) when a linear direction exists in an m×m local window, considering an edge exists in the m×m local window; c) when a linear direction does not exist in the m×m local window, dividing the m×m local window into m/2×m/2 sub windows and calculating directions of the m/2×m/2 sub windows; d) when the directions of the m/2×m/2 sub windows exists toward the center of the m×m local window, considering a corner exists in the m×m local window; and e) selecting pixels located in a virtual line that goes along in the linear direction or in the directions to calculate a new pixel value by using the pixels, each having different weight according to intensity of the direction for the existing edge and corner.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE INVENTION

Hereinafter, a method for magnifying an image by an interpolation based on an edge and a corner in accordance with the present invention will be described in detail referring to the accompanying drawings.

Figure 1:
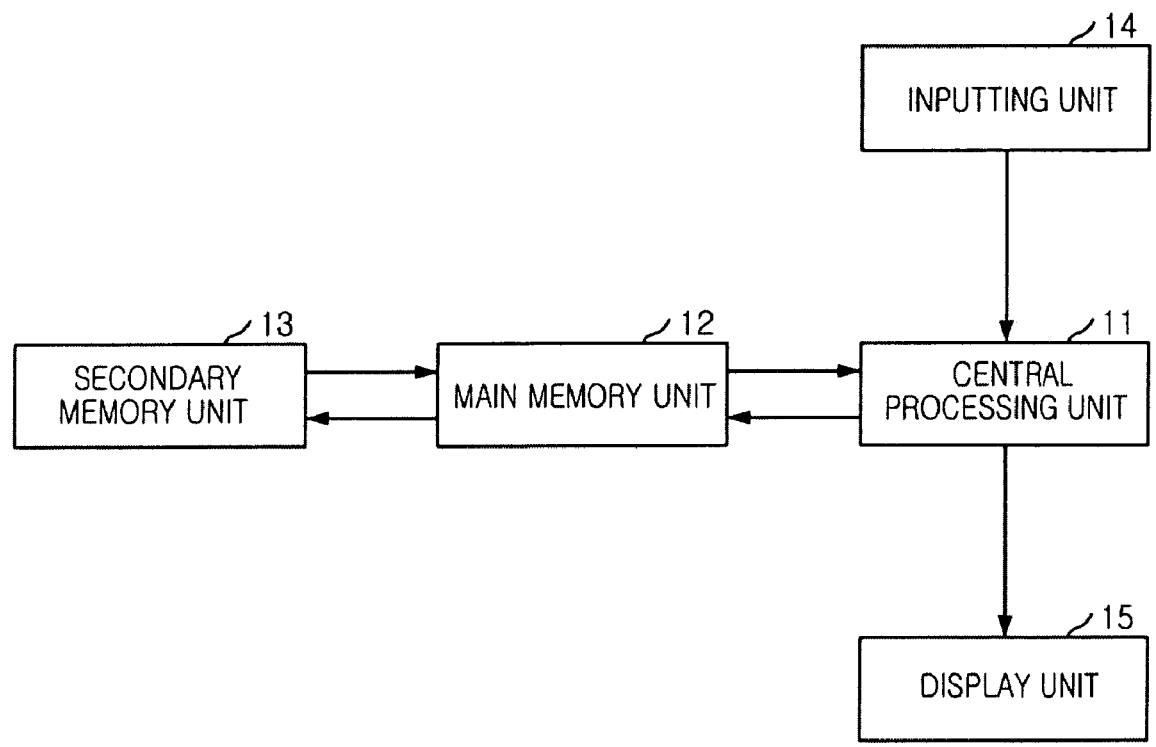
FIG. 1 is a block diagram illustrating a hardware system in accordance with a preferred embodiment of the present invention.

FIG. 1 is a block diagram illustrating a hardware system in accordance with a preferred embodiment of the present invention.

As shown, the hardware system, i.e., image processing device such as a digital camera, a copier, a scanner, a printer and a digital image displayer, includes a central processing unit (CPU) 11, a main memory unit 12, a secondary memory unit 13, an inputting unit 14 and a display unit 15.

The CPU 11 controls and manages total behaviors of the hardware system.

The main memory unit 12 and the secondary memory unit 13 store operation programs and data which are necessary for an interpolation. The secondary memory unit 13 stores a lot of data.

The inputting unit 14 and the display unit 15 provide data input/output interface to users. The inputting unit 14 can be a general keyboard and the display unit 15 can be a displayer and a printer.

As described above, the hardware system is apparent to people skilled in the art, detail explanation is omitted herein.

However, an interpolation algorithm which is embedded in the main memory unit 12 for an image enlargement based on an edge and a corner with decreasing an image quality degradation such as an edge fadeout and an aliasing phenomenon when a digital image is enlarged by arbitrary magnification will be described.

For example, in the present invention, an interpolation algorithm for the image enlargement based on an edge and a corner can be embedded as an ASIC chip form in the digital camera.

Figure 2:
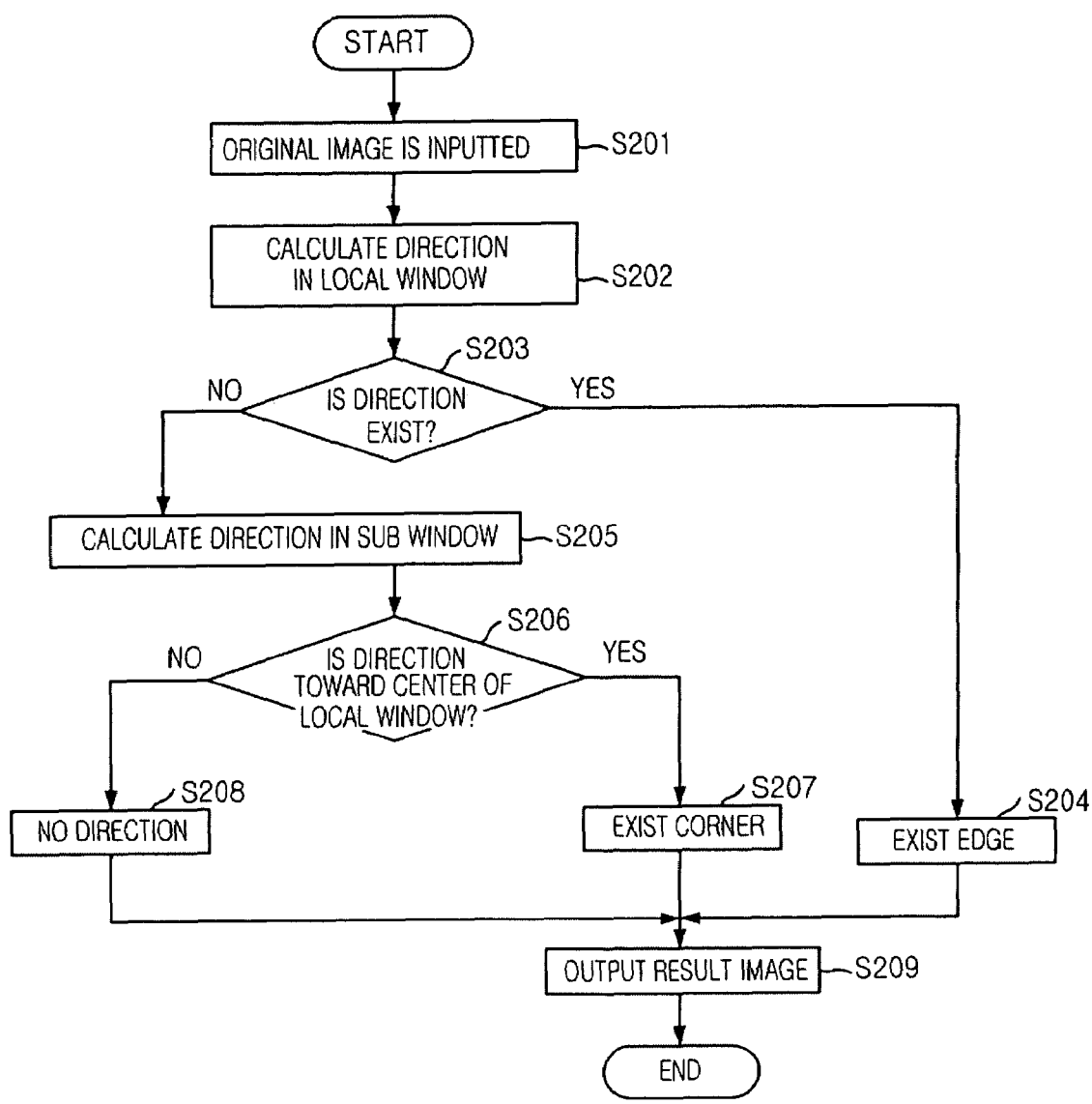
FIG. 2 is a flowchart illustrating a method for magnifying image by an interpolation based on an edge and a corner in accordance with a preferred embodiment of the present invention.

FIG. 2 is a flowchart illustrating a method for magnifying image by an interpolation based on an edge and a corner in accordance with a preferred embodiment of the present invention.

First, an original image is inputted to an image processor for enlarging an image with arbitrary magnification at step S201.

Herein, for enlarging the original image to obtain a magnified image having a new pixel, an m×m local window is selected in the original image. For all m×m local windows, outer boundaries of the original image are excluded. Herein, m is a positive integer.

At step S202, in an m×m local window, each value of squaring each difference between each pixel included in the m×m local window and each pixel included in one of 16 directional m×m local windows are summed. The summation value for each 16 directional m×m local windows is calculated. That is, the 16 directional m×m local windows corresponding to the m×m local window are used for calculating sixteen summation values.

Then, a normal distribution of pixel value differences between among pixels can be calculated in the original image. Then, a Mahalanobis value and each of sixteen summation values are compared in order to determine a direction of the m×m local window. Herein, the Mahalanobis value is an extended concept value of Z value in more than two-dimensional probability distribution.

At step S202, a direction calculation is performed to all m×m local windows.

A direction calculation in the m×m local window will be described in detail, for example, a case when m is 4.

Figure 3A:
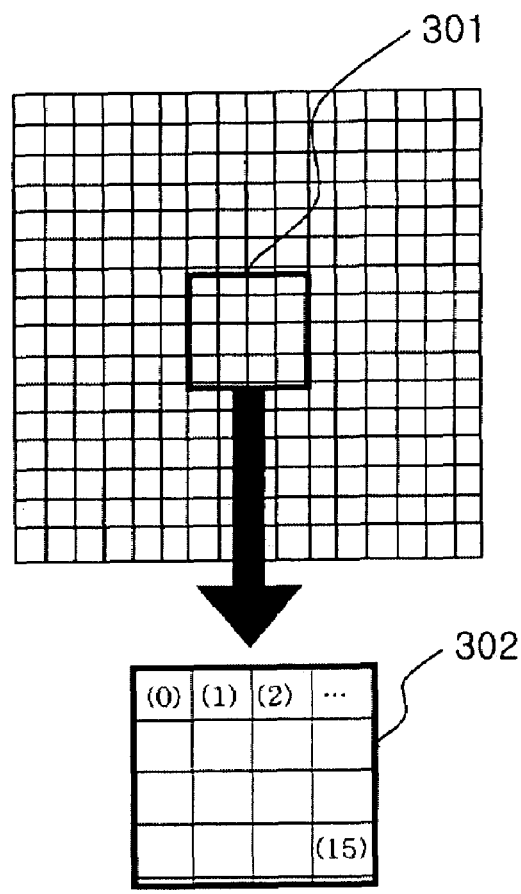
FIGS. 3A to 3D are illustrating a direction calculation on a local window in a method for magnifying image by an interpolation based on an edge and a corner in accordance with a preferred embodiment of the present invention.

In image shown in FIG. 3A, for calculating a direction of 4×4 local window 301, pixels in the 4×4 local window are indexed as enlarged 4×4 local window 302. A value of pixel (0) is called 'red(0)'; and a value of another pixel corresponding to the pixel (0) is called 'blue(0)'.

Figure 3B:
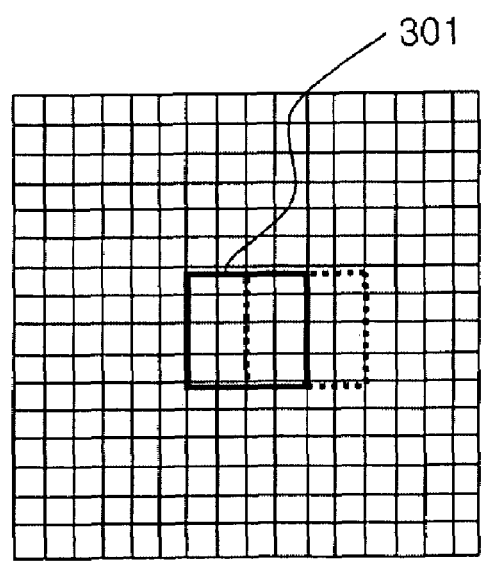

And, as shown in FIG. 3B, each value of squaring each difference between each pixel included in the 4×4 local window 301 and each pixel included in a first corresponding 4×4 local window are summed. Herein, the first corresponding 4×4 local window is obtained by moving the 4×4 local window 301 to the east by two pixels. Then, the summation result 'distance(0)' is defined as distance(0)=$\Sigma$ (red(i)-blue(i))$^2$, where $0 \leq i \leq 15$.

Figure 3C:
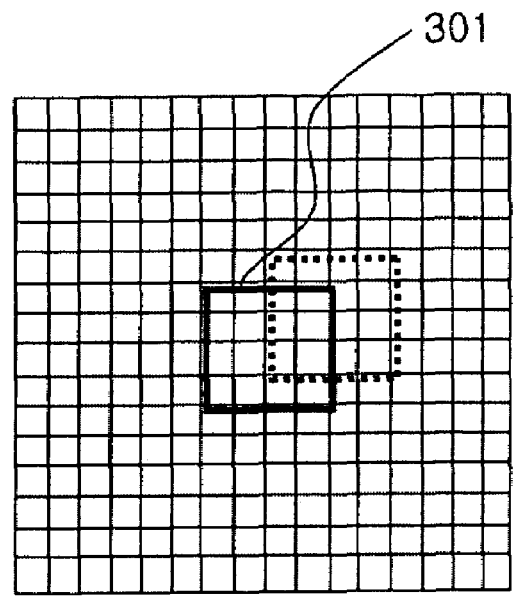

Then, as shown in FIG. 3C, each value of squaring each difference between each pixel included in the 4×4 local window 301 and each pixel included in a second corresponding 4×4 local window are summed. Herein, the second corresponding 4×4 local window is obtained by moving the 4×4 local window 301 to the east by two pixels and to the north by one pixel. Then, the summation result 'distance(1)' is defined as distance(1)=$\Sigma$ (red(i)-blue(i))$^2$, where $0 \leq i \leq 15$.

Figure 3D:
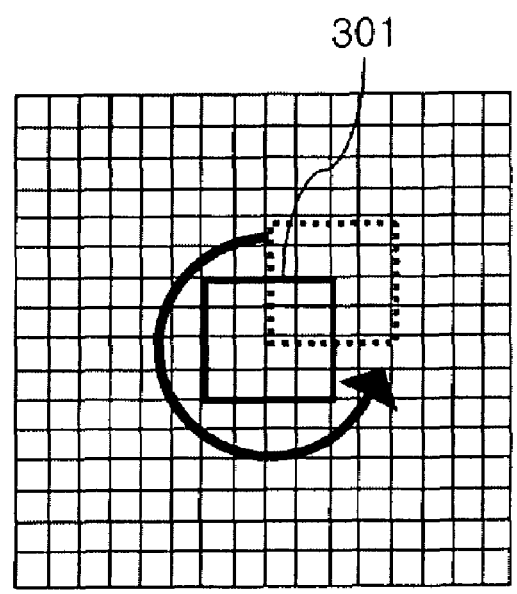

That is, as shown in FIG. 3D, each value of squaring each difference between each pixel included in the 4×4 local window 301 and each pixel included each of 16 directional 4×4 local windows around the 4×4 local window 301 are summed. Then, the 16 summation values are defined as 'distance(j)', where $0 \leq j \leq 15$.

Then, a direction of the 4×4 local window is defined as "j" having a minimum value among the distance(j).

As described above, when a direction can be found easily with the m×m local window, for example, when remarkable Mahalanobis value exists, a linear direction exists in the m×m local window at step S203. It is considered that an edge exists at step S204.

That is, when the linear direction in the m×m local window exists at step S204, pixels located in a virtual line having a direction same to that of the m×m local window are selected. Then, a new pixel value is calculated by using the pixels, each having different weight according to intensity of the direction at step S209.

However, when a direction cannot be found easily in the m×m local window, for example, remarkable Mahalanobis value does not exist at step S203, the m×m local window has no direction or forms a corner where more than two linear edges meet. Then, at step S205, directions in four m/2×m/2 sub windows are calculated by the same operation with the step S202.

In the m×m local window having a corner there is no linear direction and, generally, there is not any direction. Thus, the direction can be found with sub windows for processing the corner in the m×m local window.

Herein, when at least two directions of sub windows are strongly presented toward a center of a parent window (upper window, m×m local window) at step 206, e.g., there are directions toward the center of an upper window, it is considered that a corner exists at step S207.

Accordingly, when directions from sub windows to the center of the upper window exist at step S207, pixels located in a virtual line that goes along in the direction of the sub window are selected. Then, a new pixel value is calculated by using the pixels, each having different weight according to intensity of the direction at step S209.

Meanwhile, when there is no direction at step S208, a new pixel value is calculated by using an average value of neighbor pixels at step S209.

That is, when a direction of edge in the local window exists or directions toward the center of an upper window in the sub windows exist, pixels located in a virtual line that goes along in the direction of the local window or in the direction of the sub window are selected. Then, a new pixel value is calculated by using the pixels different weight according to intensity of the direction. However, when there is no direction, a new pixel value is calculated by using an average value of neighbor pixels. Finally, a result image with new pixel values is printed.

A direction calculation in an m/2×m/2 sub window (S250) will be described in detail, for example, in a case when m is 4.

In case of the sub window, the 4×4 local window 301 divided into four 2×2 sub windows and direction of the sub window can be found by the same method for calculating a direction of the m×m local window at step S202. Herein, all of 16 directions are not tested to find the direction of the m/2× m/2 sub window.

Figure 4A:
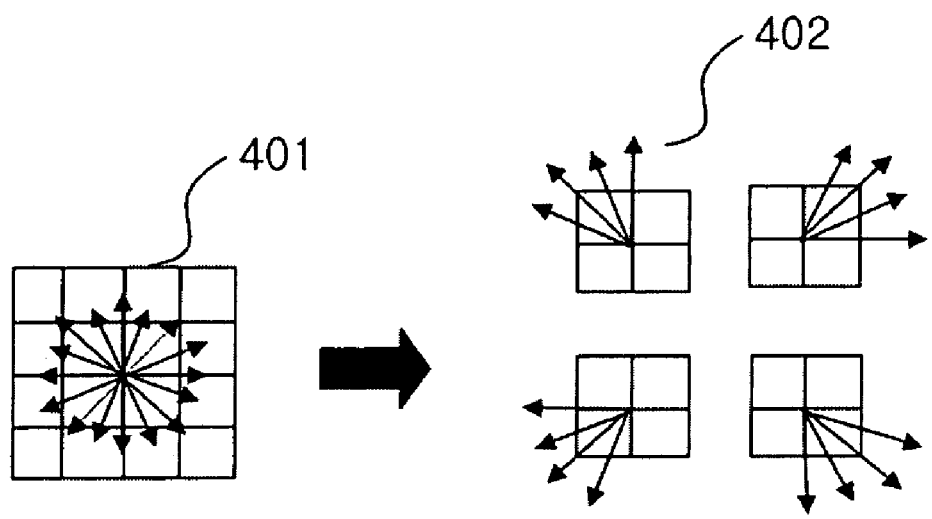
FIGS. 4A to 4C are illustrating a direction calculation on a sub window in a method for magnifying image by an interpolation based on an edge and a corner in accordance with a preferred embodiment of the present invention.

That is, as shown in FIG. 4A, in case of the 4×4 local window, all 16-directions are tested for calculating a direction (401); but, in case of the 2×2 sub window, 4-directions for each 2×2 sub window are tested for calculating a direction (402).

Figure 4B:
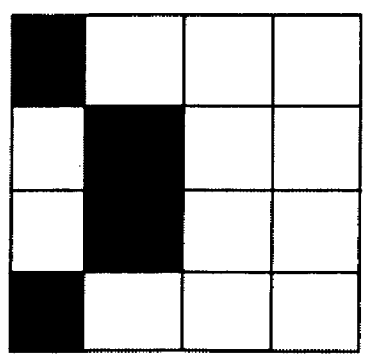

For example, if there is a sharp corner as shown in FIG. 4B, there is no direction in a linear direction test. However, two directions can be found by a method for calculating a direction of the 2×2 sub windows; and the two directions are represented as arrows 403 and 404 in FIG. 4C.

Figure 4C:
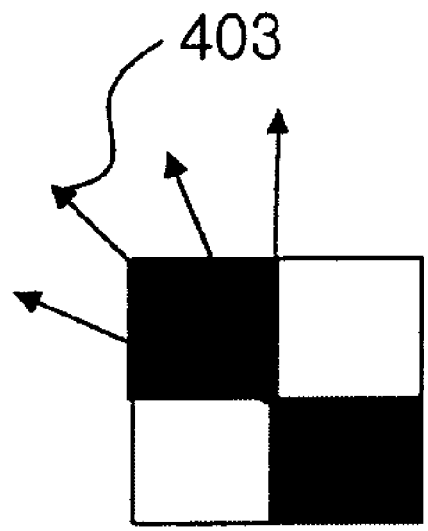
Figure 4C:
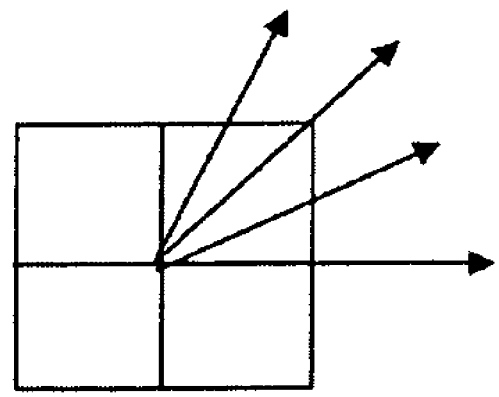
Figure 4C:
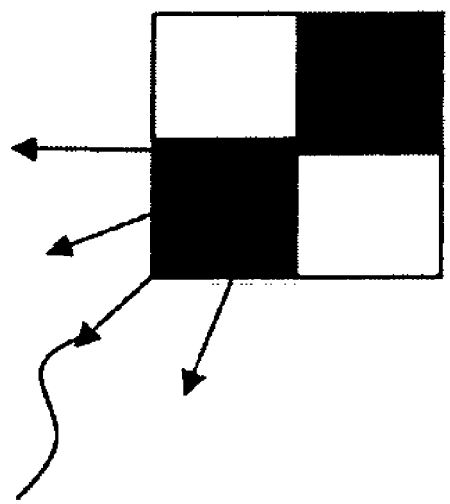
Figure 4C:
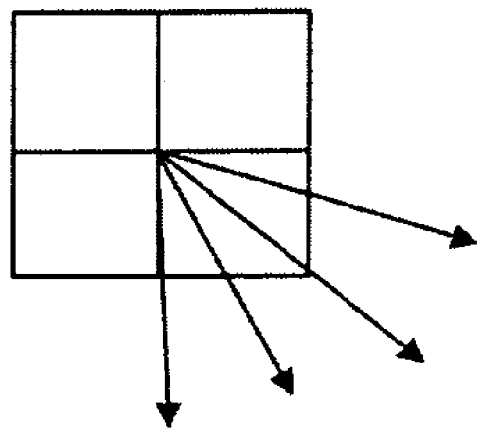

Accordingly, a new added pixel value at a center point of a local window for enlarging an image has an average value of neighbor pixels that go along in the arrows 403 and 404. In FIG. 4C, an edge and a corner do not fade because of selecting not white pixels but black pixels. Therefore, user feels better for an image quality.

Meanwhile, a Mahalanobis value is an extended concept value of Z value in more than two-dimensional probability distribution. The Z value is generally known as a one-dimensional probability distribution. If there is an estimated population average from a sample, the Z value is a measurement value which represent a sample value is how far from the population average and whether the sample value is a distinctive value or not.

For example, in case of one-dimensional probability distribution, if Z value, determined as Z=(x−mean)/standard deviation, is less than 2 (more particularly, 1.96), this sample value(x) is considered that included in the distribution with 95 percent probability. If the Z value is more than 2, this sample value(x) is defined as a distinctive value.

In case of the present invention, if a particular distance is distinctively shorter than a total distance distribution, a direction exists.

The present invention deals with a one-dimensional data using a one-dimensional probability distribution which can perform T test using the Z value is satisfied. The Mahalanobis value is needed to extend more than two-dimensional data.

The above described method according to the present invention can be embodied as a program and be stored on a computer readable recording medium. The computer readable recording medium is any data storage device that can store data which can be read by the computer system. The computer readable recording medium includes a read-only memory (ROM), a random-access memory (RAM), a CD-ROM, a floppy disk, a hard disk and an optical magnetic disk.

As described above, the present invention can decrease image quality degradation caused by an edge fadeout and an aliasing when a digital image is arbitrary magnified by an image processor such as a digital camera, a duplicator, a scanner, a printer, a digital image displayer, a document editor, and a graphic software.

The present application contains subject matter related to Korean patent application No. 2004-0108839, filed in the Korean Patent Office on Dec. 20, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A method for magnifying image by an interpolation based on an edge and a corner, the method comprising the steps of:
   a) setting m×m local windows excluding outer boundaries of an original image, when the original image inputted for image enlargement by arbitrary magnification, and calculating a direction of each m×m local window;
   b) when a linear direction exists in an m×m local window, considering an edge exists in the m×m local window;
   c) when a linear direction does not exist in the m×m local window, dividing the m×m local window into m/2×m/2 sub windows and calculating directions of the m/2×m/2 sub windows;
   d) when the directions of the m/2×m/2 sub windows exists toward the center of the m×m local window, considering a corner exists in the m×m local window; and
   e) selecting pixels located in a virtual line that goes along in the linear direction or in the directions to calculate a new pixel value by using the pixels, each having different weight according to intensity of the direction for the existing edge and corner.

2. The method as recited in claim 1, further comprising a step of:
   f) when the linear direction of the m×m local window and the directions of the m/2×m/2 sub windows do not exist, calculating a new value using an average value of neighbor pixels.

3. The method as recited in claim 1, wherein the step a) includes the steps of:
   a1) calculating a sum of squares of a differences between pixel values of the m×m local window and pixel values of each corresponding m×m local window for sixteen corresponding m×m local windows;
   a2) calculating a normal distribution of pixel differences between all pixels in the original image; and
   a3) comparing a Mahalanobis value and the summation value to determine a direction in the m×m local window.

4. The method as recited in claim 1, wherein a variable m is 4, and a 4×4 local window is divided into four 2×2 sub windows, then 4 directions for each 2×2 sub window are tested and totally 16 directions are tested.

5. The method as recited in claim 4, wherein the step a1) includes the steps of:
   a1) assuming pixels in the 4×4 local window are indexed and a value of pixel (0) is called 'red(0)'; and a value of another pixel corresponding to the pixel (0) is called 'blue(0)' to calculate direction of the 4×4 local window;
   a2) summing square values of the differences between pixel values of the 4×4 local window and pixel values of a first corresponding 4×4 local window obtained by moving the 4×4 local window to the east by two pixels and defining the first summation result 'distance(0)' as distance(0)=Σ(red(i)−blue(i))$^2$, where $0 \leq i \leq 15$;

a3) summing square values of the differences between pixel values of the 4×4 local window and pixel values of a second corresponding 4×4 local window obtained by moving the 4×4 local window to the east by two pixels and north by one pixel and defining the second summation result 'distance(1)' as distance(1)=Σ(red(i)−blue(i))$^2$, where $0 \leq i \leq 15$;

a4) summing square values of the differences between pixel values of the 4×4 local window and pixel values of a corresponding 4×4 local window for each sixteen direction around the 4×4 local window and defining the summation results as 'distance(j)', where $0 \leq j \leq 15$; and a5) determining a direction of the 4×4 local window having a minimum value among the distance(j).

* * * * *